United States Patent
Chakraborty et al.

(10) Patent No.: US 11,860,703 B1
(45) Date of Patent: Jan. 2, 2024

(54) CODE-BASED TECHNIQUE TO MITIGATE POWER TELEMETRY SIDE-CHANNEL LEAKAGE FROM SYSTEM BUSES

(71) Applicant: Intel Corporation, Santa Clara, CA (US)

(72) Inventors: Abhishek Chakraborty, Hillsboro, OR (US); Chen Liu, Hillsboro, OR (US); Jason Fung, Portland, OR (US); Neer Roggel, Albuquerque, NM (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/881,110

(22) Filed: Aug. 4, 2022

(51) Int. Cl.
*G06F 21/72* (2013.01)
*G06F 1/30* (2006.01)

(52) U.S. Cl.
CPC .............. *G06F 1/305* (2013.01); *G06F 21/72* (2013.01)

(58) Field of Classification Search
CPC ................................ G06F 1/305; G06F 21/72
See application file for complete search history.

(56) References Cited

U.S. PATENT DOCUMENTS

| | | | |
|---|---|---|---|
| 9,736,181 B2 | 8/2017 | Mevergnies et al. | |
| 2005/0108507 A1* | 5/2005 | Chheda | G06F 9/30167 712/E9.035 |
| 2005/0273631 A1* | 12/2005 | Shu | H04L 9/0625 712/E9.035 |

OTHER PUBLICATIONS

Mehdi-Laurent Akkar and Christophe Giraud, "An Implementation of DES and AES, Secure against Some Attacks," CHES 2001, LNCS 2162, 2001, pp. 309-318.
Moritz Lipp et al., "PLATYPUS: Software-based Power Side-Channel Attacks on x86," 2021, 17 pages, IEEE.
R. Soares et al., "Hardware Countermeasures against Power Analysis Attacks: a Survey from Past to Present," Journal of Integrated Circuits and Systems, 2021, 12 pages, vol. 16, No. 2.
Stefan Tillich et al., "Protecting AES Software Implementations on 32-Bit Processors Against Power Analysis," ACNS 2007, LNCS 4521, 2007, pp. 141-157, Graz University of Technology, Graz, Austria.

* cited by examiner

*Primary Examiner* — Mark A Connolly
(74) *Attorney, Agent, or Firm* — Jaffery Watson Mendonsa & Hamilton LLP

(57) ABSTRACT

The technology disclosed herein determining one or more vulnerable instructions in workload code and determining one or more additional instructions to be inserted in the workload code based at least in part on a power model of a system bus of a processor, when a power model of a processor is dependent on an order of instructions of workload code, inserting the one or more additional instructions with dependency to the workload code to produce complementary power consumption of the system bus to power consumption of the system bus from executing the one or more vulnerable instructions; and when the power model is not dependent on the order of instructions of workload code, inserting the one or more additional instructions without dependency to the workload code to produce complementary power consumption of the system bus to power consumption of the system bus from executing the one or more vulnerable instructions.

21 Claims, 10 Drawing Sheets

```
1:  pxor %%xmm0, %%xmm11
2:  aesenc %%xmm1, %%xmm11
3:  aesenc %%xmm2, %%xmm11
4:  aesenc %%xmm3, %%xmm11
5:  aesenc %%xmm4, %%xmm11
6:  aesenc %%xmm5, %%xmm11
7:  aesenc %%xmm6, %%xmm11
8:  aesenc %%xmm7, %%xmm11
9:  aesenc %%xmm8, %%xmm11
10: aesenc %%xmm9, %%xmm11
11: aesenclast %%xmm10, %%xmm11
```

| Register | Content |
|----------|---------|
| xmm0 | round key 0 |
| xmm1 | round key 1 |
| xmm2 | round key 2 |
| xmm3 | round key 3 |
| xmm4 | round key 4 |
| xmm5 | round key 5 |
| xmm6 | round key 6 |
| xmm7 | round key 7 |
| xmm8 | round key 8 |
| xmm9 | round key 9 |
| xmm10 | round key 10 |
| xmm11 | plaintext / ciphertext/ AES state |

FIG. 2

| Register | Content |
|---|---|
| xmm0 | round key 0 |
| xmm1 | round key 1 |
| xmm2 | round key 2 |
| xmm3 | round key 3 |
| xmm4 | round key 4 |
| xmm5 | round key 5 |
| xmm6 | round key 6 |
| xmm7 | round key 7 |
| xmm8 | round key 8 |
| xmm9 | round key 9 |
| xmm10 | round key 10 |
| xmm11 | plaintext / AES state / intermediate data / ciphertext |
| xmm12 | intermediate data |
| xmm13 | all ones |
| xmm14 | random data |

```
1:  vpxor %%xmm13, %%xmm11, %%xmm12
2:  pxor %%xmm0, %%xmm11
3:  pxor %%xmm0, %%xmm12
4:  aesenc %%xmm1, %%xmm12
5:  aesenc %%xmm1, %%xmm11
6:  aesenc %%xmm2, %%xmm11
7:  aesenc %%xmm3, %%xmm11
8:  aesenc %%xmm4, %%xmm11
9:  aesenc %%xmm5, %%xmm11
10: aesenc %%xmm6, %%xmm11
11: aesenc %%xmm7, %%xmm11
12: aesenc %%xmm8, %%xmm11
13: aesenc %%xmm9, %%xmm11
14: vaesenclast %%xmm10, %%xmm11, %%xmm12
15: pxor %%xmm12, %%xmm11
16: pxor %%xmm12, %%xmm11
17: pxor %%xmm13, %%xmm11
18: pxor %%xmm14, %%xmm11
19: aesenclast %%xmm14, %%xmm11
20: pxor %%xmm14, %%xmm11
21: aesdeclast %%xmm14, %%xmm11
22: pxor %%xmm13, %%xmm11
23: aesenclast %%xmm10, %%xmm11
```

FIG. 3

| Line No. | Instruction | State Bus | Result Bus |
|---|---|---|---|
| 1 | vpxor %%xmm13, %%xmm11, %%xmm12 | — | — |
| 2 | pxor %%xmm0, %%xmm11 | — | — |
| 3 | pxor %%xmm0, %%xmm12 | — | — |
| 4 | aesenc %%xmm1, %%xmm12 | !s0^k0 | X |
| 5 | aesenc %%xmm1, %%xmm11 | s0^k0 | s1 |

☐ : Sum of HWs due to state bus data: HW(!s0^k0)+HW(s0^k0)=128

FIG. 4

| Line No. | Instruction | State Bus | Result Bus |
|---|---|---|---|
| 13 | aesenc %%xmm9, %%xmm11 | s8 | s9 |
| 14 | vaesenclast %%xmm10, %%xmm11, %%xmm12 | s9 | s10 |
| 15 | pxor %%xmm12, %%xmm11 | — | — |
| 16 | pxor %%xmm12, %%xmm11 | — | — |
| 17 | pxor %%xmm13, %%xmm11 | — | — |
| 18 | pxor %%xmm14, %%xmm11 | — | — |
| 19 | aesenclast %%xmm14, %%xmm11 | !s9^X | — |
| 20 | pxor %%xmm14, %%xmm11 | — | Y |
| 21 | aesdeclast %%xmm14, %%xmm11 | Y^X | — |
| 22 | pxor %%xmm13, %%xmm11 | — | !s9 |
| 23 | aesenclast %%xmm10, %%xmm11 | s9 | s10 |

☐ : Sum of HDs due to result bus data: HD(s9,s10)+HD(!s9,s10)=128

Y: intermediate data
X: random content of xmm14 register

CODE-BASED TECHNIQUE TO MITIGATE POWER TELEMETRY SIDE-CHANNEL LEAKAGE FROM SYSTEM BUSES

FIELD OF THE DISCLOSURE

This disclosure relates generally to security in computing systems, and more particularly, to mitigating side-channel attacks based on power telemetry data.

BACKGROUND

Computing systems typically offer access to software-accessible hardware telemetry data to users for gaining insights into computing hardware resource utilization, power efficiency, system performance, and reliability. However, from a security perspective, hardware telemetry readings arising from data-dependent power consumption (e.g., as reported by a Running Average Power Limit (RAPL) interface) can be exploited to retrieve confidential data. It has been found that among all the hardware components in a processor die, the internal system buses (high-capacitance long wires) are a source of data-dependent power consumption. Mitigating the data dependencies in power consumption of system bus activity to deter attacks is desirable.

BRIEF DESCRIPTION OF THE DRAWINGS

FIG. 2 is an example of instructions and registers for a baseline advanced encryption standard (AES) 128 implementation.

FIG. 3 is an example of instructions and registers for a hardened AES-128 implementation according to some embodiments.

FIG. 4 is an example of instructions, state bus values and result bus values from a Hamming weight (HW) power model according to some embodiments.

FIG. 5 is an example of instructions, state bus values and result bus values from a Hamming distance (HD) power model according to some embodiments.

The figures are not to scale. In general, the same reference numbers will be used throughout the drawing(s) and accompanying written description to refer to the same or like parts.

DETAILED DESCRIPTION

Figure 1:
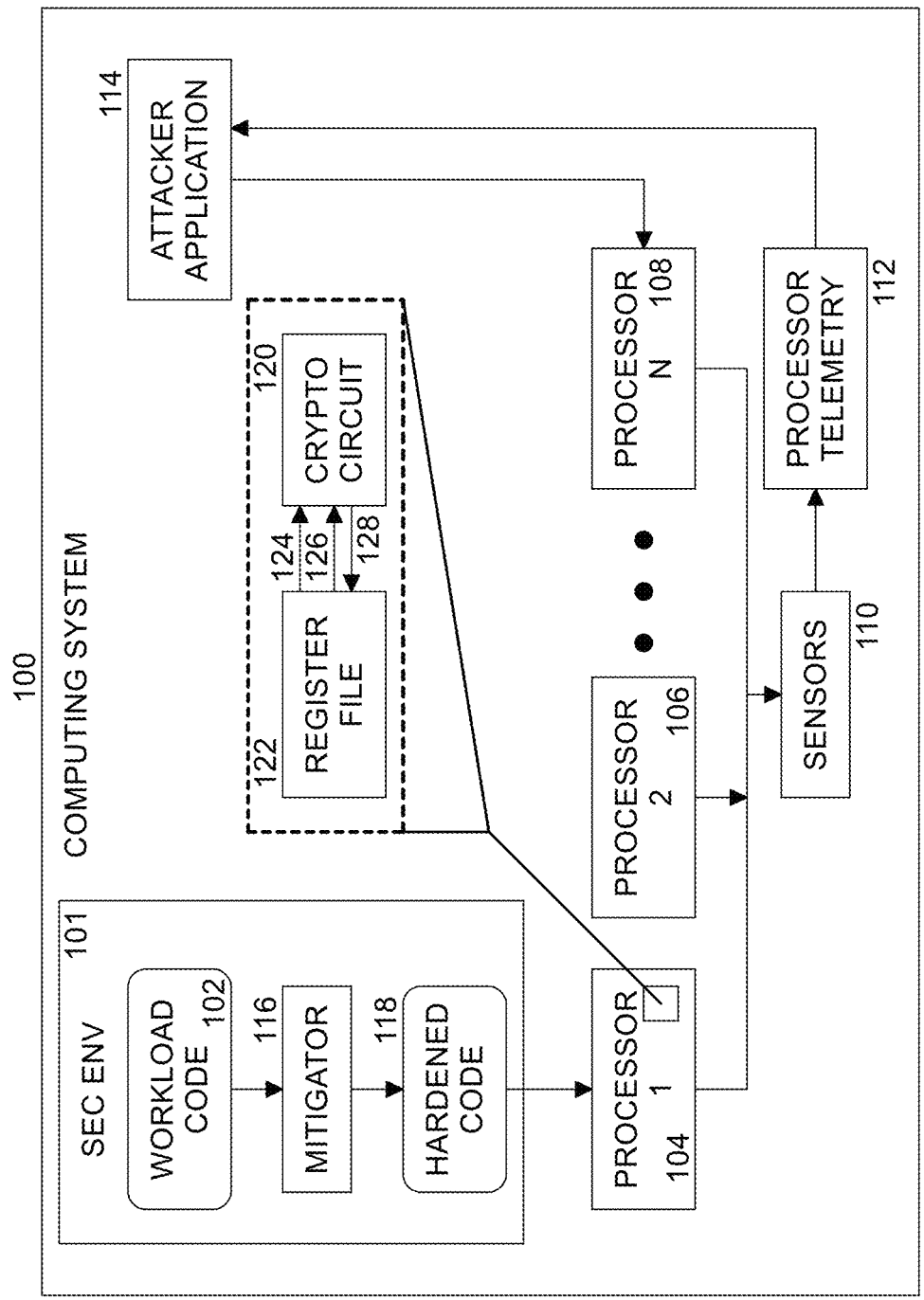
FIG. 1 illustrates a computing system according to some embodiments.

The technology described herein provides a method and system for an effective reduction of power telemetry side-channel leakage arising from the transmission of sensitive data over system buses. The technology described herein inserts one or more additional instructions into a program such that there is a reduced amount of power telemetry side-channel information leakage in subsequent reported telemetry readings during execution of the program.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized and that logical, mechanical, electrical and/or other changes may be made without departing from the scope of the subject matter of this disclosure. The following detailed description is, therefore, provided to describe example implementations and not to be taken as limiting on the scope of the subject matter described in this disclosure. Certain features from different aspects of the following description may be combined to form yet new aspects of the subject matter discussed below.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real-world imperfections.

As used herein, "processor circuitry" or "hardware resources" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

As used herein, a computing system can be, for example, a server, a personal computer, a workstation, a self-learning machine (e.g., a neural network), a mobile device (e.g., a cell phone, a smart phone, a tablet computer (such as an iPad™)), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

Although hardware-based schemes have been proposed to mitigate power side-channel attacks, hardware modification is considered out of scope for the hundreds of millions of computing systems which have already been shipped to users. Also, hardware implemented countermeasures impose significant silicon overhead to underlying security cryptographic engine circuit implementations in updated computing systems.

Existing software countermeasures to prevent power side-channel attacks include techniques such as masking, shuffling, and noise injection. The masking scheme reduces the side-channel information leakage of a cryptographic implementation by using secret shares to randomize intermediate computations. However, even for a masked design (e.g., a masked Advanced Encryption Standard (AES) design), an attacker can still launch a Correlation Power Analysis (CPA) attack using power telemetry information to deduce the secret key. This is because the Hamming distance (HD) between the input and output of an AES round transmitted over the same system bus (e.g., interfacing to/from an AES New Instructions (AES-NI) cryptographic engine circuit) is independent of the mask value. The shuffling scheme executes the independent operations of a cryptographic algorithm in a random order with the goal of confusing the side-channel attacker. However, the system reported telemetry information is coarse-grained (has low temporal resolution) and the system typically captures the aggregate energy consumption of all the operations in an execution of a cryptographic algorithm. Therefore, randomizing the order of execution of intermediate operations using shuffling will not add to the complexity of the CPA attack. Noise injection-based schemes aim to reduce the signal-to-noise ratio (SNR) of the leaked information by introducing additional noise in the power side-channel traces. Injection of noise will increase the minimum-time-to-disclose (MTD) the secret key by an attacker. However, by collecting a greater number of telemetry side-channel traces, the attacker will eventually be able to extract the key using statistical analyses.

To overcome such disadvantages, the technology described herein uses a code-based countermeasure to mitigate the power side-channel information leakage via telemetry readings arising from the transmission of sensitive data over system buses. In at least one implementation, this technology inserts one or more instructions in selected portions of program code such that the power consumption profile of one or more internal system buses (as observed via a telemetry interface) during execution of the program is invariant to the value of the secret (e.g., encrypted) data being communicated over the one or more buses. That is, observing the power consumption of the system buses in a side-channel attack while the program is executing will not result in any useful information for attempting to deduce the secret data.

This technology enables the use of telemetry data of computing system power management without exposing sensitive information due to the side-channel leakage from internal system buses of a processor die. This technology, which includes a software (SW) or firmware (FW) based approach, does not require any modifications to computing system hardware and therefore it can also be applied to computing systems which have already been shipped to customers. This technology can be easily integrated with a cryptographic software library, thereby not introducing any additional coding burden for end users. Also, the latency overhead is much lower (for example, on average approximately 15 times lower) compared to existing software solutions against power side-channel attacks. This technology can be extended to secure computing environments such as a Trusted Execution Environment (TEE) available from Intel Corporation, and Secure Encrypted Virtualization (SEV) available from Advanced Micro Devices, Inc. (AMD), and TrustZone available from ARM, Ltd.

FIG. 1 illustrates a computing system 100 according to some embodiments. A typical power telemetry-based side-channel attack is staged by attacker application 114 (e.g., a Ring-0 application). The victim program, comprising workload code 102, is executed by a one of the processors 104, 106, . . . 108 inside a secure environment (SEC ENV) 101, such as a TEE (e.g., including Software Guard Extensions (SGX) available from Intel Corporation), AMD SEV, or ARM TrustZone), which guarantees that even privileged software cannot directly access any secret information of the workload code. One objective of attacker application 114 is to deduce secret information (e.g., one or more cryptographic keys) of the workload code 102 by correlating the secret data-dependent computations and/or communications over internal system buses with the accessible power telemetry readings.

Computing system 100 includes a plurality of processors, denoted processor 1 104, processor 2 106, . . . processor N 108. One or more of these processors include one or more dedicated cryptographic engines 120 (for example, cryptographic circuits such as AES-NI, available from Intel Corporation) which offer enhanced security against attacks, including side-channel attacks. In one implementation, cryptographic (crypto) engine 120 provides one or more of encryption and/or decryption operations. However, interfacing system buses, such as state bus 124, key bus 126, and result bus 128, which connect cryptographic engine 120 to register file 122 within the processor die, are not hardened against power telemetry side-channel attacks. It has been found that these interfacing buses 124, 126, 128 (e.g., high capacitance long wires) are a source of data-dependent power side-channel information leakage.

As shown in FIG. 1, for the example crypto engine 120 there are two input buses, state bus 124 and key bus 126, which carry the input state and the round key for a particular AES round, respectively. There is one output bus, called the result bus 128, which carries the output state for the AES round. The objective of an attacker is to utilize the knowledge of plaintext/ciphertext data to model the data-dependent power consumption of the state/result buses (which has been shown to be a source of leakage) for different key guesses. Subsequently, the attacker can correlate such hypothetical power consumption values with the actual power telemetry data (as captured by on-chip sensors 110) to deduce a secret cryptographic key.

Thus, attacker application 114, being executed on one of the processors, such as processor N 108, can read power telemetry data generated by processor telemetry circuitry 112 from one or more sensors 110 (where sensors 110 have sensed power consumption data from one or more of the processors 104, 106, . . . 108). In one scenario, the power telemetry data includes power consumption information associated with one or more of cryptographic engine 120, state bus 124, key bus 126, and/or result bus 128 of a processor. Attacker application 114 can use this processor telemetry data to try to deduce secret data (e.g., keys) in a power telemetry side-channel attack.

The technology described herein comprises a code-based countermeasure to mitigate exploitable power telemetry side-channel leakage arising from the transmission of sensitive data over system buses (e.g., state bus 124, key bus 126, and/or result bus 128). Note that existing software solutions do not address the issue of side-channel leakage arising from these buses or other internal system buses. In an implementation, mitigator 116, executing in secure environment 101, analyzes workload code 102 and adds one or more additional instructions to workload code 102 to generate hardened code 118. When hardened code 118 is executed by a processor, no useful power telemetry side-channel information can be obtained by attacker application 114 because the resulting power telemetry data does not vary with the data being communicated over one or more of buses 124, 126 and/or 128. Thus, the attacker application cannot deduce any of the secret data being communicated over one or more of buses 124, 126, and/or 128 based on the power telemetry data.

For power telemetry side-channel analysis, power models such as the Hamming weight (HW) power model and the Hamming distance (HD) power model are often used. Both HW/HD power models have a property in which the estimated energy consumption of a system bus is proportional to the HW/HD values of the data being transmitted. This property may be taken advantage of by attackers to attempt to deduce secret data.

In one implementation, the following two properties of HW/HD metrics are used (along with the knowledge of the instruction set architecture (ISA) of a computing system and the system bus architecture) to develop one or more instructions to be added to workload code to suppress power telemetry side-channel leakage from system buses.

Let A and B be two Boolean vectors of length n. Let !A denote the Boolean complement of A and the operator "^" represent a bitwise XOR operation between two Boolean vectors.

Property $P1: HW(A)+HW(!A)=n$

Property $P2: HD(A,B)+B)=HW(A\hat{}B)+HW(!A\hat{}B)=n$

When A and B represent data being communicated over internal system buses, such as buses 124, 126, and/or 128, properties P1 and P2 may be used to mitigate against power telemetry side-channel attacks as shown below.

To mitigate against a HW power model-based side-channel attack, in an implementation, mitigator 116 uses property P1 to generate hardened code 118 from workload code 102. If there is a potential information leakage in the processor telemetry circuitry 112 readings due to the transmission of data A (generated by or accessed by workload code 102) over an internal system bus (such as state bus 124, key bus 126 and/or result bus 128), then mitigator 116 adds one or more additional instructions to workload code 102 such that there is one or more additional bus transmissions carrying the complementary data !A. As per the on-chip telemetry measurement by processor telemetry circuitry 112 (which is coarse-grained), the aggregated energy for the bus transmissions of the hardened code includes the energy consumption proportional to both HW(A) and HW (!A). As outlined in property P1, this aggregated energy will be an amount invariant to the value of secret A, as if the HW was equal to the bus width of n bits.

Similarly, to mitigate a HD power model-based side-channel attack, in an implementation, mitigator 116 uses property P2 to generate hardened code 118 from workload code 102. If there is a potential information leakage in the processor telemetry circuitry 112 readings due to the toggling of data A to data B over an internal system bus (such as state bus 124, key bus 126 and/or result bus 128), then mitigator 116 inserts one or more additional instructions to workload code 102 to generate hardened code such that there is an additional bus toggling from data !A to data B when the hardened code is executed. Then, the processor telemetry circuitry 112 readings captures the aggregated energy consumption proportional to both HD(A,B) and H(!A,B). As per property P2, such reported aggregated energy consumption will be invariant to the secret data values.

The present code-based countermeasure is not specific to any computing system hardware and may be applied to protect any sensitive system bus transmission in any computing system. For illustration purposes, consider a baseline AES-128 design (implemented, for example, using AES-NI instructions) as a case study to highlight the computing system's susceptibility to a power telemetry side-channel attack. Subsequently, it will be demonstrated herein how the present technique may be used to design a protected version of AES-128 which is resistant to such side-channel attacks.

FIG. 2 is an example of instructions and registers for a baseline Advanced Encryption Standard (AES) 128 implementation. Typically, the attacker (e.g., attacker application 114) uses knowledge of plaintext/ciphertext data to target round key 0 and round key 10 with Hamming weight (HW) and/or Hamming distance (HD) power models. The attacker attempts recovery of round key 0 by using the HW power model to estimate the power consumption in an internal system bus, such as state bus 124, due to transactions of the outcome of an initial XOR between the plaintext and round key 0. The attacker attempts recovery of round key 10 by using the HD power model to estimate the power consumption in an internal system bus, such as result bus 128, due to toggling operations between outputs of round 9 and round 10 (e.g., the ciphertext).

The example baseline (AES-NI-based) AES-128 implementation as shown in FIG. 2 may be analyzed to develop additional instructions to be added to workload code for suppressing the power telemetry side-channel leakage from the state bus 124 and result bus 128 of the crypto engine 120. FIG. 3 is an example of instructions and registers for a protected AES-128 implementation according to some embodiments. The side-channel security vulnerability of the two cases may be addressed as follows.

To protect round key 0 (k0) from HW power model-based leakage from state bus 124, three additional instructions, for example, may be inserted into workload code 102 to generate hardened code 118 as shown in FIG. 3 at lines 1, and 3-4, which satisfy the property P1. FIG. 4 is an example of instructions, state bus values and result bus values from a Hamming weight (HW) power model according to some embodiments. FIG. 4 illustrates the secret data-invariance of power telemetry readings arising from state bus 124 transactions which do not leak any side-channel information about k0. For example, the sum of HWs due to state bus data is $HW(!s0\hat{}k0)+HW(s0\hat{}k0)=128$; where s0 is plaintext data (for encryption), and k0 is round key 0. Note that the bus width n for the example crypto engine 120 is 128 bits. For notational simplicity, the output state of round X of an AES-128 implementation is denoted using sX.

To protect round key 10 (k10) from HD power model-based leakage from the result bus 128, in this example nine additional instructions may be inserted into workload code 102 to generate hardened code 118 as shown in FIG. 3 at lines 14-20, which satisfy property P2. Unlike the simpler HW power model scenario, this optimized set of additional instructions was strategically crafted to ensure that there is a strict enforcement of read after write (RAW) dependency for every result bus transaction following the penultimate round of the AES algorithm (i.e., following line 13 of FIG. 3). This is necessary to satisfy the property P2 in case of out-of-order execution of instructions as performed in most high-performance computing systems. FIG. 5 is an example of instructions, state bus and result bus values from an HD power model according to some embodiments. FIG. 5 shows the secret data-invariance of power telemetry readings arising from the result bus transactions such that there is no exploitable side-channel information leakage. For example, the sum of HDs due to result bus data is HD(s9, s10)+HD(!s9, s10)=128; where s10 is ciphertext.

Figure 6:
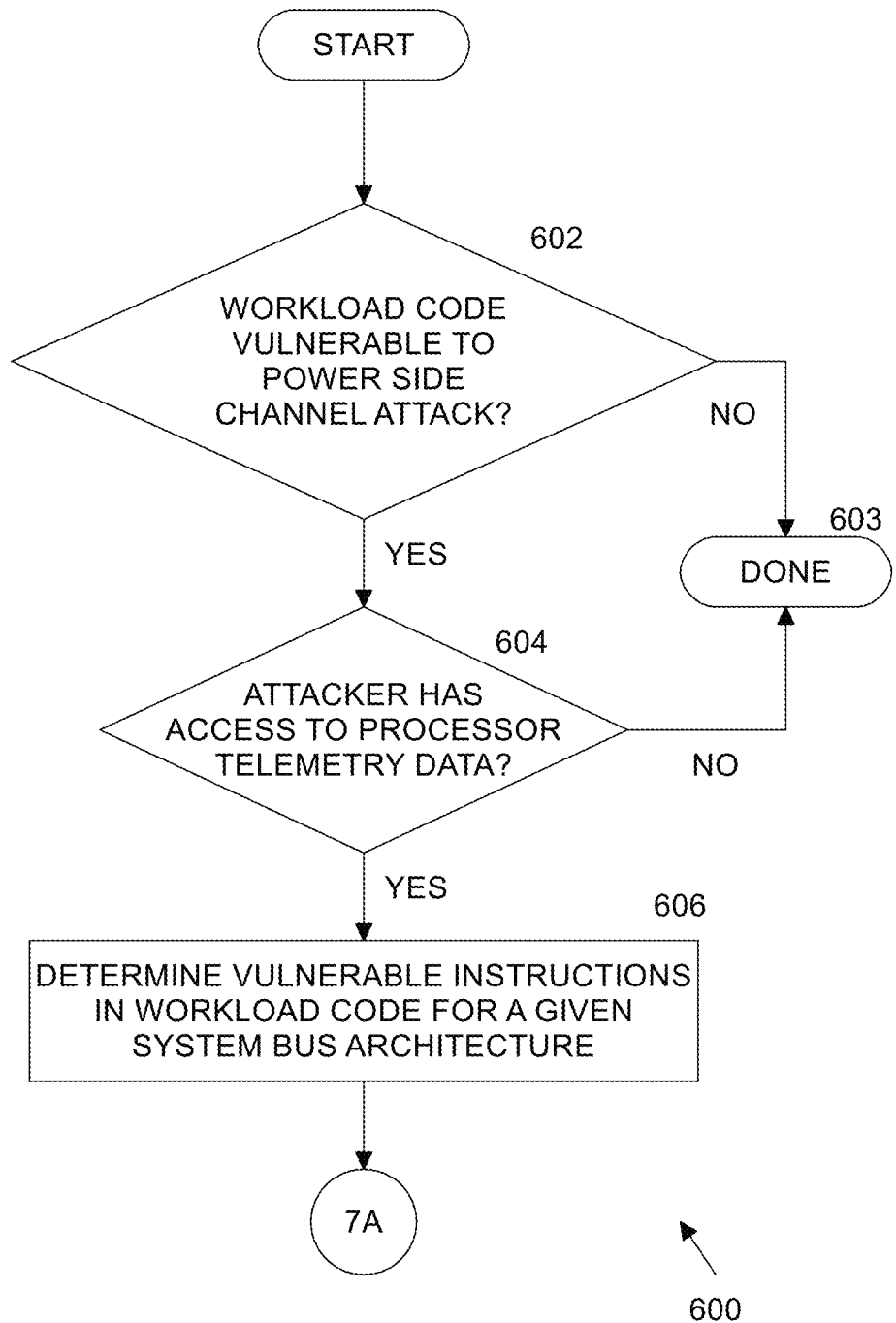
FIGS. 6 and 7 are flow diagrams of mitigation processing according to some embodiments.
Figure 7:
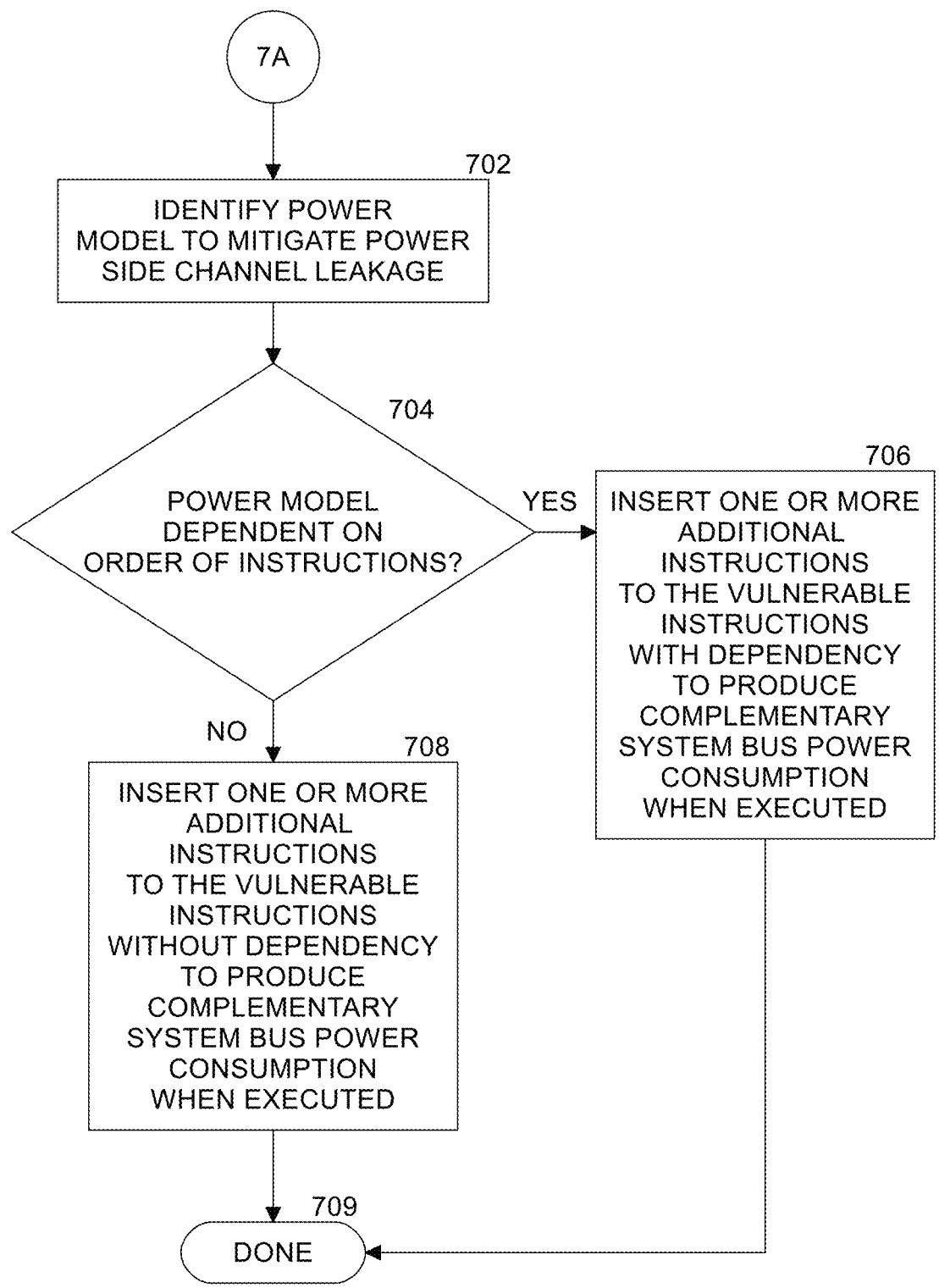

FIGS. 6 and 7 are flow diagrams of mitigation processing according to some embodiments. At block 602 of FIG. 6, mitigator 116 assesses if workload code 102 is vulnerable to a physical power side-channel attack. Such assessment of vulnerability is conducted based on one or more of the following factors: (i) whether the workload code 102 contains any secret asset (e.g., cryptographic keys); and (ii) whether the power consumption during the execution of the workload code 102 in computing system hardware is a function of the secret asset. If the workload code is not vulnerable to a physical power side channel attack, then no changes to the workload code 102 are needed and processing ends at block 603. If the workload code 102 is vulnerable to a power side channel attack, mitigator 116 determines if the attacker (e.g., attacker application 114) has access to processor telemetry data from processor telemetry circuitry 112. Note that the mitigator 116 has the knowledge of the privilege level (e.g., Ring-0 level) of the attacker application 114 in the threat model of the workload code 102 and for the given privilege level whether the attacker application 114 has the permission to access processor telemetry data. If not, no changes to the workload code 102 are needed and processing ends at block 603. If the attacker does have access to processor telemetry data, then at block 606 mitigator 116 determines vulnerable instructions in workload code 102. Note that the identification of vulnerable instructions is based on the information about the workload code 102 which is available to the attacker as well as the system bus architecture (e.g., if the attacker has the knowledge of plaintext for the baseline AES-128 implementation, then the instruction (line 2 of FIG. 2) which transmits the result of the initial XOR between the plaintext and round key 0 over the state bus 124 is identified as a vulnerable instruction). Processing continues on FIG. 7.

At block 702 of FIG. 7, mitigator 116 identifies a power model to mitigate power telemetry side-channel leakage. In an implementation, a power model may be either a HW power model or a HD power model. At block 704, if the power model is dependent on an order of the instructions in the workload code 102, then it is assumed that a HD power model is being used in the attack and at block 706 mitigator 116 inserts one or more additional instructions to the vulnerable instructions of the workload code 102 with a read after write (RAW) dependency enforcement to produce hardened code 118 with complementary system bus power consumption when the hardened code is executed. At block 706, if the power model is not dependent on an order of the instructions in the workload code 102, then it is assumed that a HW power model is being used in the attack and at block 708 mitigator 116 inserts one or more additional instructions to the vulnerable instructions of the workload code without a dependency (in any order) to produce hardened code 118 with complementary system bus power consumption when the hardened code is executed. In either case, then processing is complete at block 709. Blocks 702 through 709 may be repeated as necessary. By inserting the additional one or more instructions into workload code 102 to generate hardened code 118, execution of hardened code mitigates against power telemetry side-channel attacks.

While an example manner of implementing the technology described herein is illustrated in FIGS. 1-7, one or more of the elements, processes, and/or devices illustrated in FIGS. 1-7 may be combined, divided, re-arranged, omitted, eliminated, and/or implemented in any other way. Further, the example mitigator 116 may be implemented by hardware, software, firmware, and/or any combination of hardware, software, and/or firmware. Thus, for example, any portion of mitigator 116 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, in at least one of example mitigator 116 is/are hereby expressly defined to include a non-transitory computer readable storage device or storage disk such as a memory, a digital versatile disk (DVD), a compact disk (CD), a Blu-ray disk, etc., including the software and/or firmware. Further still, the example circuitry of FIG. 1 may include one or more elements, processes, and/or devices in addition to, or instead of, those illustrated in FIG. 1, and/or may include more than one of any or all the illustrated elements, processes and devices.

Flowcharts representative of example hardware logic circuitry, machine readable instructions, hardware implemented state machines, and/or any combination thereof for implementing the computing system 100 of FIG. 1 is shown in FIGS. 6-7. The machine-readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIG. 9. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The tangible machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 6-7, many other methods of implementing the example computing system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 6-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 8:
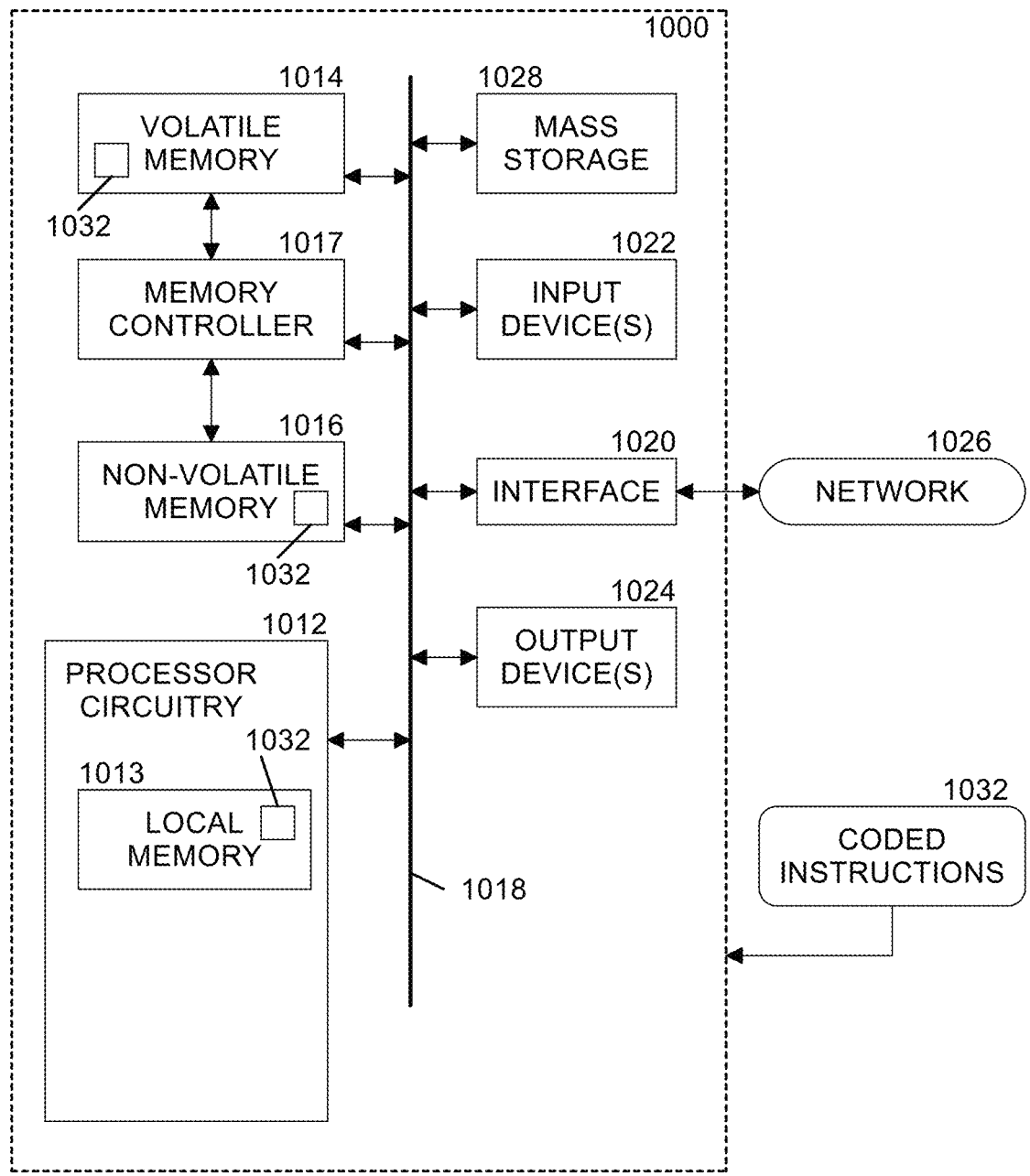
FIG. 8 is a block diagram of an example processor platform structured to execute and/or instantiate the machine-readable instructions and/or operations of FIGS. 6-7 to implement the apparatus discussed with reference to FIG. 1.

FIG. 8 is a block diagram of an example processor platform 1000 structured to execute and/or instantiate the machine-readable instructions and/or operations of FIGS. 6-7 to implement the apparatus of FIG. 1. In an embodiment, processor platform 1000 is an example of computing system 100 of FIG. 1. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1000 of the illustrated example includes processor circuitry 1012. The processor circuitry 1012 of the illustrated example is hardware. For example, the processor circuitry 1012 can be implemented by one or more integrated circuits, logic circuits, FPGAs microprocessors, CPUs, GPUs, DSPs, and/or microcontrollers from any desired family or manufacturer. The processor circuitry 1012 may be implemented by one or more semiconductor based (e.g., silicon based) devices. In this example, the processor circuitry 1012 implements the example one or more processors 104, 106, . . . 108.

The processor circuitry 1012 of the illustrated example includes a local memory 1013 (e.g., a cache, registers, etc.). The processor circuitry 1012 of the illustrated example is in communication with a main memory including a volatile memory 1014 and a non-volatile memory 1016 by a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1016 may be implemented by flash memory and/or any other desired type of memory device. Access to the main memory 1014, 1016 of the illustrated example is controlled by a memory controller 1017.

The processor platform 1000 of the illustrated example also includes interface circuitry 1020. The interface circuitry 1020 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1022 are connected to the interface circuitry 1020. The input device(s) 1022 permit(s) a user to enter data and/or commands into the processor circuitry 1012. The input device(s) 1022 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1024 are also connected to the interface circuitry 1020 of the illustrated example. The output devices 1024 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1020 of the illustrated example, thus, typically includes a graphics driver card, a graphics driver chip, and/or graphics processor circuitry such as a GPU.

The interface circuitry 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1026. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1000 of the illustrated example also includes one or more mass storage devices 1028 to store software and/or data. Examples of such mass storage devices 1028 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1032, which may be implemented by the machine-readable instructions of FIGS. 6-7, may be stored in the mass storage device 1028, in the volatile memory 1014, in the non-volatile memory 1016, and/or on a removable non-transitory computer readable storage medium such as a CD or DVD.

Figure 9:
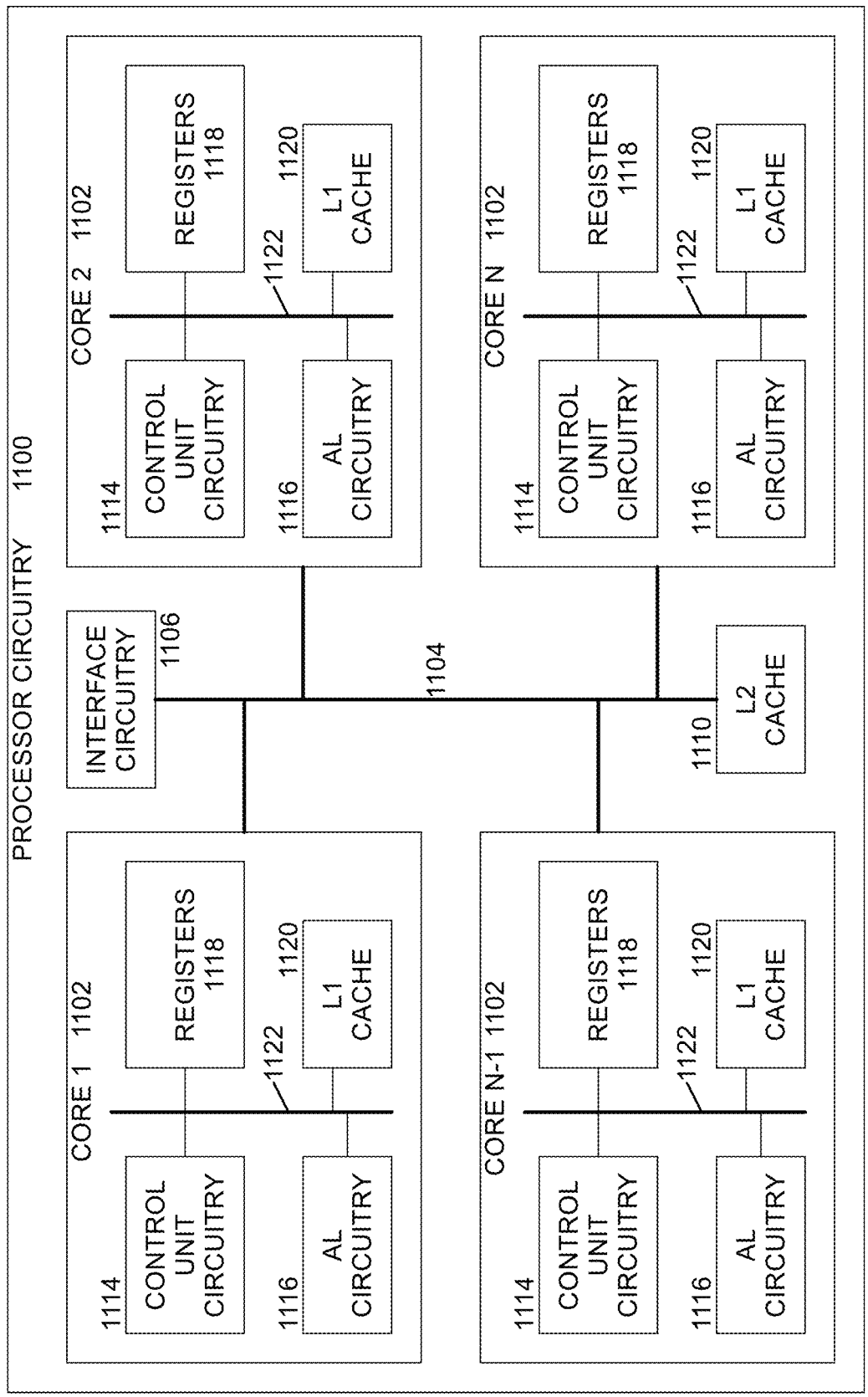
FIG. 9 is a block diagram of an example implementation of the processor circuitry of FIG. 8.

FIG. 9 is a block diagram of an example implementation of the processor circuitry 1012 of FIG. 8. In this example, the processor circuitry 1012 of FIG. 8 is implemented by a microprocessor 1100. For example, the microprocessor 1100 may implement multi-core hardware circuitry such as a CPU, a DSP, a GPU, an XPU, etc. Although it may include any number of example cores 1102 (e.g., 1 core), the microprocessor 1100 of this example is a multi-core semiconductor device including N cores. The cores 1102 of the microprocessor 1100 may operate independently or may cooperate to execute machine readable instructions. For example, machine code corresponding to a firmware program, an embedded software program, or a software program may be executed by one of the cores 1102 or may be executed by multiple ones of the cores 1102 at the same or different times. In some examples, the machine code corresponding to the firmware program, the embedded software program, or the software program is split into threads and executed in parallel by two or more of the cores 1102. The software program may correspond to a portion or all the machine-readable instructions and/or operations represented by the flowcharts of FIGS. 6-7.

The cores 1102 may communicate by an example bus 1104. In some examples, the bus 1104 may implement a communication bus to effectuate communication associated with one(s) of the cores 1102. For example, the bus 1104 may implement at least one of an Inter-Integrated Circuit (I2C) bus, a Serial Peripheral Interface (SPI) bus, a PCI bus, or a PCIe bus. Additionally or alternatively, the bus 1104 may implement any other type of computing or electrical bus. The cores 1102 may obtain data, instructions, and/or signals from one or more external devices by example interface circuitry 1106. The cores 1102 may output data, instructions, and/or signals to the one or more external devices by the interface circuitry 1106. Although the cores 1102 of this example include example local memory 1120 (e.g., Level 1 (L1) cache that may be split into an L1 data cache and an L1 instruction cache), the microprocessor 1100 also includes example shared memory 1110 that may be shared by the cores (e.g., Level 2 (L2_ cache)) for high-speed access to data and/or instructions. Data and/or instructions may be transferred (e.g., shared) by writing to and/or reading from the shared memory 1110. The local memory 1120 of each of the cores 1102 and the shared memory 1110 may be part of a hierarchy of storage devices including multiple levels of cache memory and the main memory (e.g., the main memory 1014, 1016 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1102 may be referred to as a CPU, DSP, GPU, etc., or any other type of hardware circuitry. Each core 1102 includes control unit circuitry 1114, arithmetic and logic (AL) circuitry (sometimes referred to as an ALU) 1116, a plurality of registers 1118, the L1 cache in local memory 1120, and an example bus 1122. Other structures may be present. For example, each core 1102 may include vector unit circuitry, single instruction multiple data (SIMD) unit circuitry, load/store unit (LSU) circuitry, branch/jump unit circuitry, floating-point unit (FPU) circuitry, etc. The control unit circuitry 1114 includes semiconductor-based circuits structured to control (e.g., coordinate) data movement within the corresponding core 1102. The AL circuitry 1116 includes semiconductor-based circuits structured to perform one or more mathematic and/or logic operations on the data within the corresponding core 1102. The AL circuitry 1116 of some examples performs integer-based operations. In other examples, the AL circuitry 1116 also performs floating point operations. In yet other examples, the AL circuitry 1116 may include first AL circuitry that performs integer-based operations and second AL circuitry that performs floating point operations. In some examples, the AL circuitry 1116 may be referred to as an Arithmetic Logic Unit (ALU). The registers 1118 are semiconductor-based structures to store data and/or instructions such as results of one or more of the operations performed by the AL circuitry 1116 of the corresponding core 1102. For example, the registers 1118 may include vector register(s), SIMD register(s), general purpose register(s), flag register(s), segment register(s), machine specific register(s), instruction pointer register(s), control register(s), debug register(s), memory management register(s), machine check register(s), etc. The registers 1118 may be arranged in a bank as shown in FIG. 8. Alternatively, the registers 1118 may be organized in any other arrangement, format, or structure including distributed throughout the core 1102 to shorten access time. The bus 1104 may implement at least one of an I2C bus, a SPI bus, a PCI bus, or a PCIe bus.

Each core 1102 and/or, more generally, the microprocessor 1100 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1100 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Although FIG. 9 illustrates an example implementation of the processor circuitry 1012 of FIG. 8, many other approaches are contemplated.

In some examples, the processor circuitry 1012 of FIG. 8 may be in one or more packages. For example, the processor circuitry 1100 of FIG. 9 may be in one or more packages. In some examples, an XPU may be implemented by the processor circuitry 1012 of FIG. 8, which may be in one or more packages. For example, the XPU may include a CPU in one package, a DSP in another package, a GPU in yet another package, and an FPGA in still yet another package.

Figure 10:
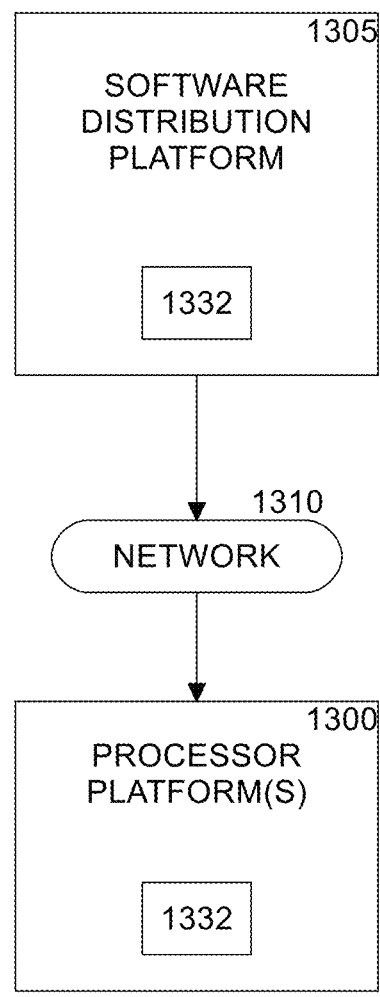
FIG. 10 is a block diagram illustrating an example software distribution platform to distribute software such as the example machine readable instructions of FIG. 8 to hardware devices owned and/or operated by third parties.

A block diagram illustrating an example software distribution platform 1305 to distribute software such as the example machine readable instructions 1032 of FIG. 8 to hardware devices owned and/or operated by third parties is illustrated in FIG. 10. The example software distribution platform 1305 may be implemented by any computer server, data facility, cloud service, etc., capable of storing and transmitting software to other computing devices. The third parties may be customers of the entity owning and/or operating the software distribution platform 1305. For example, the entity that owns and/or operates the software distribution platform 1305 may be a developer, a seller, and/or a licensor of software such as the example machine readable instructions 1032 of FIG. 8. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the machine-readable instructions 1032, which may correspond to the example machine readable instructions, as described above. The one or more servers of the example software distribution platform 1305 are in communication with a network 1310, which may correspond to any one or more of the Internet and/or any of the example networks, etc., described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 1032 from the software distribution platform 1305. For example, the software, which may correspond to the example machine readable instructions described above, may be downloaded to the example processor platform 1300, which is to execute the machine-readable instructions 1032 to implement the methods described above and associated computing system 200. In some examples, one or more servers of the software distribution platform 1305 periodically offer, transmit, and/or force updates to the software (e.g., the example machine readable instructions 1032 of FIG. 7) to ensure improvements, patches, updates, etc., are distributed and applied to the software at the end user devices.

In some examples, an apparatus includes means for processing mitigator 116 of secure environment 101 of FIG. 1. For example, the means for processing may be implemented by processor circuitry, processor circuitry, firmware circuitry, etc. In some examples, the processor circuitry may be implemented by machine executable instructions executed by processor circuitry, which may be implemented by the example processor circuitry 1012 of FIG. 8 or the example processor circuitry 1100 of FIG. 9. In other examples, the processor circuitry is implemented by other hardware logic circuitry, hardware implemented state machines, and/or any other combination of hardware, software, and/or firmware. For example, the processor circuitry may be implemented by at least one or more hardware circuits (e.g., processor circuitry, discrete and/or integrated analog and/or digital circuitry, an Application Specific Integrated Circuit (ASIC), a comparator, an operational-amplifier (op-amp), a logic circuit, etc.) structured to perform the corresponding operation without executing software or firmware, but other structures are likewise appropriate.

From the foregoing, it will be appreciated that example systems, methods, apparatus, and articles of manufacture have been disclosed that provide improved mitigation against power telemetry side-channel attacks. The disclosed systems, methods, apparatus, and articles of manufacture improve the security of using a computing device. The disclosed systems, methods, apparatus, and articles of manufacture are accordingly directed to one or more improvement(s) in the operation of a machine such as a computer or other electronic and/or mechanical device.

The following examples pertain to further embodiments. Specifics in the examples may be used anywhere in one or more embodiments. Example 1 is a method including determining one or more vulnerable instructions in workload code; determining one or more additional instructions to be inserted in the workload code based at least in part on a power model of a system bus of a processor; when a power model of a processor is dependent on an order of instructions of workload code, inserting the one or more additional instructions with dependency to the workload code which, when executed by the processor, produces complementary power consumption of the system bus to power consumption of the system bus from executing the one or more vulnerable instructions; and when the power model is not dependent on the order of instructions of workload code, inserting the one or more additional instructions without dependency to the workload code which, when executed by the processor, produces complementary power consumption of the system bus to power consumption of the system bus from executing the one or more vulnerable instructions.

In Example 2, the subject matter of Example 1 can optionally include wherein the power model dependent on the order of instructions of the workload code is a Hamming distance (HD) power model. In Example 3, the subject matter of Example 2 can optionally include wherein a sum of HDs arising from executing the one or more vulnerable instructions and the one or more additional instructions by the processor is a width of the system bus. In Example 4, the subject matter of Example 1 can optionally include wherein the power model not dependent on the order of instructions of the workload code is a Hamming weight (HW) power model. In Example 5, the subject matter of Example 4 can optionally include wherein wherein a sum of HWs arising from executing the one or more vulnerable instructions and the one or more additional instructions by the processor is a width of the system bus. In Example 6, the subject matter of Example 1 can optionally include wherein the dependency comprises a read after write (RAW) dependency. In Example 7, the subject matter of Example 1 can optionally include wherein the system bus comprises an internal system bus between a register file and a cryptographic circuit in the processor. In Example 8, the subject matter of Example 1 can optionally include wherein the system bus comprises one of a state bus, a key bus, and a result bus and the cryptographic circuit is to perform one or more of encryption operations and decryption operations of an Advanced Encryption Standard (AES) cryptographic process. In Example 9, the subject matter of Example 1 can optionally include wherein executing the one or more vulnerable instructions and the one or more additional instructions by the processor results in power consumption of the system bus and complementary power consumption of the system bus that is invariant for data communicated over the system bus.

Example 10 is at least one tangible machine-readable non-transitory medium comprising a plurality of instructions that in response to being executed by a processor cause the processor to: determine one or more vulnerable instructions in workload code; determine one or more additional instructions to be inserted in the workload code based at least in part on a power model of a system bus of a processor; when a power model of a processor is dependent on an order of instructions of workload code, insert the one or more additional instructions with dependency to the workload code which, when executed by the processor, produces complementary power consumption of the system bus to power consumption of the system bus from executing the one or more vulnerable instructions; and when the power model is not dependent on the order of instructions of workload code, insert the one or more additional instructions without dependency to the workload code which, when executed by the processor, produces complementary power consumption of the system bus to power consumption of the system bus from executing the one or more vulnerable instructions In Example 11 the subject matter of Example 10 can optionally include wherein the power model dependent on the order of instructions of the workload code is a Hamming distance (HD) power model. In Example 12 the subject matter of Example 11 can optionally include wherein a sum of HDs arising from executing the one or more vulnerable instructions and the one or more additional instructions by the processor is a width of the system bus. In Example 13 the subject matter of Example 10 can optionally include wherein the power model not dependent on the order of instructions of the workload code is a Hamming weight (HW) power model. In Example 14 the subject matter of Example 13 can optionally include wherein a sum of HWs arising from executing the one or more vulnerable instructions and the one or more additional instructions by the processor is a width of the system bus. In Example 15 the subject matter of Example 10 can optionally include wherein executing the one or more vulnerable instructions and the one or more additional instructions by the processor results in power consumption of the system bus and complementary power consumption of the system bus that is invariant for data communicated over the system bus.

Example 16 is an apparatus comprising a processor; and a memory coupled to the processor, the memory having instructions stored thereon that, in response to execution by the processor cause the processor to determine one or more vulnerable instructions in workload code; determine one or more additional instructions to be inserted in the workload code based at least in part on a power model of a system bus of a processor; when a power model of a processor is dependent on an order of instructions of workload code, insert the one or more additional instructions with dependency to the workload code which, when executed by the processor, produces complementary power consumption of the system bus to power consumption of the system bus from executing the one or more vulnerable instructions; and when the power model is not dependent on the order of instructions of workload code, insert the one or more additional instructions without dependency to the workload code which, when executed by the processor, produces complementary power consumption of the system bus to power consumption of the system bus from executing the one or more vulnerable instructions In Example 17 the subject matter of Example 16 can optionally include wherein the power model dependent on the order of instructions of the workload code is a Hamming distance (HD) power model. In Example 18 the subject matter of Example 17 can optionally include wherein the power model not dependent on the order of instructions of the workload code is a Hamming weight (HW) power model. In Example 19 the subject matter of Example 16 can optionally include wherein executing the one or more vulnerable instructions and the one or more additional instructions by the processor results in power consumption of the system bus and complementary power consumption of the system bus that is invariant for data communicated over the system bus. In Example 20 the subject matter of Example 16 can optionally include wherein the system bus comprises an internal system bus between a register file and a cryptographic circuit in the processor. In Example 21 the subject matter of Example 16 can optionally include wherein the system bus comprises one of a state bus, a key bus, and a result bus and the cryptographic circuit is to perform one or more of encryption operations and decryption operations of an Advanced Encryption Standard (AES) cryptographic process.

Example 22 is an apparatus operative to perform the method of any one of Examples 1 to 9. Example 23 is an apparatus that includes means for performing the method of any one of Examples 1 to 9. Example 24 is an apparatus that includes any combination of modules and/or units and/or logic and/or circuitry and/or means operative to perform the method of any one of Examples 1 to 9. Example 25 is an optionally non-transitory and/or tangible machine-readable medium, which optionally stores or otherwise provides instructions that if and/or when executed by a computer system or other machine are operative to cause the machine to perform the method of any one of Examples 1 to 9.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the examples of this patent.

What is claimed is:

1. A method comprising:
   determining one or more vulnerable instructions in workload code;
   determining one or more additional instructions to be inserted in the workload code based at least in part on a power model of a system bus of a processor;
   when a power model of a processor is dependent on an order of instructions of workload code, inserting the one or more additional instructions with dependency to the workload code which, when executed by the processor, produces complementary power consumption of the system bus to power consumption of the system bus from executing the one or more vulnerable instructions; and
   when the power model is not dependent on the order of instructions of workload code, inserting the one or more additional instructions without dependency to the workload code which, when executed by the processor, produces complementary power consumption of the system bus to power consumption of the system bus from executing the one or more vulnerable instructions.

2. The method of claim 1, wherein the power model dependent on the order of instructions of the workload code is a Hamming distance (HD) power model.

3. The method of claim 2, wherein a sum of HDs arising from executing the one or more vulnerable instructions and the one or more additional instructions by the processor is a width of the system bus.

4. The method of claim 1, wherein the power model not dependent on the order of instructions of the workload code is a Hamming weight (HW) power model.

5. The method of claim 4, wherein a sum of HWs arising from executing the one or more vulnerable instructions and the one or more additional instructions by the processor is a width of the system bus.

6. The method of claim 1, wherein the dependency comprises a read after write (RAW) dependency.

7. The method of claim 1, wherein the system bus comprises an internal system bus between a register file and a cryptographic circuit in the processor.

8. The method of claim 7, wherein the system bus comprises one of a state bus, a key bus, and a result bus and the cryptographic circuit is to perform one or more of encryption operations and decryption operations of an Advanced Encryption Standard (AES) cryptographic process.

9. The method of claim 1, wherein executing the one or more vulnerable instructions and the one or more additional instructions by the processor results in system bus power consumption and complementary system bus power consumption that is invariant for data communicated over the system bus.

10. At least one tangible machine-readable non-transitory medium comprising a plurality of instructions that in response to being executed by a processor cause the processor to:
    determine one or more vulnerable instructions in workload code;
    determine one or more additional instructions to be inserted in the workload code based at least in part on a power model of a system bus of a processor;
    when a power model of a processor is dependent on an order of instructions of workload code, insert the one or more additional instructions with dependency to the workload code which, when executed by the processor, produces complementary power consumption of the system bus to power consumption of the system bus from executing the one or more vulnerable instructions; and when the power model is not dependent on the order of instructions of workload code, insert the one or more additional instructions without dependency to the workload code which, when executed by the processor, produces complementary power consumption of the system bus to power consumption of the system bus from executing the one or more vulnerable instructions.

11. The at least one tangible machine-readable non-transitory medium of claim 10, wherein the power model dependent on the order of instructions of the workload code is a Hamming distance (HD) power model.

12. The at least one tangible machine-readable non-transitory medium of claim 11, wherein a sum of HDs arising from executing the one or more vulnerable instructions and the one or more additional instructions by the processor is a width of the system bus.

13. The at least one tangible machine-readable non-transitory medium of claim 10, wherein the power model not dependent on the order of instructions of the workload code is a Hamming weight (HW) power model.

14. The at least one tangible machine-readable non-transitory medium of claim 13, wherein a sum of HWs arising from executing the one or more vulnerable instructions and the one or more additional instructions by the processor is a width of the system bus.

15. The at least one tangible machine-readable non-transitory medium of claim 10, wherein executing the one or more vulnerable instructions and the one or more additional instructions by the processor results in power consumption of the system bus and complementary power consumption of the system bus that is invariant for data communicated over the system bus.

16. An apparatus comprising:
a processor; and
a memory coupled to the processor, the memory having instructions stored thereon that, in response to execution by the processor cause the processor to:
determine one or more vulnerable instructions in workload code;
determine one or more additional instructions to be inserted in the workload code based at least in part on a power model of a system bus of a processor;
when a power model of a processor is dependent on an order of instructions of workload code, insert the one or more additional instructions with dependency to the workload code which, when executed by the processor, produces complementary power consumption of the system bus to power consumption of the system bus from executing the one or more vulnerable instructions; and
when the power model is not dependent on the order of instructions of workload code, insert the one or more additional instructions without dependency to the workload code which, when executed by the processor, produces complementary power consumption of the system bus to power consumption of the system bus from executing the one or more vulnerable instructions.

17. The apparatus of claim 16, wherein the power model dependent on the order of instructions of the workload code is a Hamming distance (HD) power model.

18. The apparatus of claim 16, wherein the power model not dependent on the order of instructions of the workload code is a Hamming weight (HW) power model.

19. The apparatus of claim 16, wherein executing the one or more vulnerable instructions and the one or more additional instructions by the processor results in power consumption of the system bus and complementary power consumption of the system bus that is invariant for data communicated over the system bus.

20. The apparatus of claim 16, wherein the system bus comprises an internal system bus between a register file and a cryptographic circuit in the processor.

21. The apparatus of claim 20, wherein the system bus comprises one of a state bus, a key bus, and a result bus and the cryptographic circuit is to perform one or more of encryption operations and decryption operations of an Advanced Encryption Standard (AES) cryptographic process.

* * * * *